US010253738B2

(12) United States Patent
Da Costa et al.

(10) Patent No.: US 10,253,738 B2
(45) Date of Patent: Apr. 9, 2019

(54) DIESEL FUEL FILTER ASSEMBLY

(71) Applicant: SOGEFI ENGINE SYSTEMS USA, INC., Rochester Hills, MI (US)

(72) Inventors: Paulo Da Costa, Les Clayes Sous Bois (FR); Matt Tenbusch, Milford, MI (US); Chris Allen, Southgate, MI (US); Christophe Guillon, Vire (FR); Fabien Sanet, Rochester Hills, MI (US); Yann Berland, Ablis (FR); Tom Kern, Rochester Hills, MI (US)

(73) Assignee: Sogefi Engine Systems USA, Inc., Rochester Hills, MI (US)

( * ) Notice: Subject to any disclaimer, the term of this patent is extended or adjusted under 35 U.S.C. 154(b) by 90 days.

(21) Appl. No.: 15/258,485

(22) Filed: Sep. 7, 2016

(65) Prior Publication Data

US 2017/0067426 A1    Mar. 9, 2017

Related U.S. Application Data

(60) Provisional application No. 62/215,332, filed on Sep. 8, 2015.

(51) Int. Cl.
*F02M 37/22*     (2006.01)
*B01D 36/00*     (2006.01)
(Continued)

(52) U.S. Cl.
CPC ......... *F02M 37/221* (2013.01); *B01D 17/045* (2013.01); *B01D 29/07* (2013.01);
(Continued)

(58) Field of Classification Search
CPC .... F02M 37/221; B01D 36/003; B01D 35/30; B01D 36/008; B01D 35/005;
(Continued)

(56) References Cited

U.S. PATENT DOCUMENTS 4,491,120 A    1/1985   Hodgkins
4,618,423 A    10/1986  Hodgkins
(Continued)

FOREIGN PATENT DOCUMENTS

EP    0362114 A2    4/1990
WO    2003099414 A1    12/2003
WO    2005010339 A1    2/2005

OTHER PUBLICATIONS

European Search Report dated Jan. 25, 2017, 6 pages.

*Primary Examiner* — Madeline Gonzalez
(74) *Attorney, Agent, or Firm* — Warner Norcross & Judd LLP

(57) ABSTRACT

A filtration assembly filters diesel fuel used by a diesel engine and includes a filter element disposed within a housing. The housing includes an unfiltered fuel inlet and a filtered fuel outlet. The filter element disposed within the housing receives fuel from the fuel inlet. The filter element defines a peripheral wall sealably engaging filter media defining an unfiltered side and a filtered side of the filter element. The unfiltered side is enclosed with an impermeable barrier affixed to the peripheral wall and the filtered side is enclosed with a permeable water diffuser through which filtered fuel passes. A water separator assembly is disposed externally to the filter element receiving filtered fuel from the water diffuser. The water separator assembly includes water separator media preventing water from passing into the separator. The separator assembly interconnects to the filtered fuel outlet providing filtered, dewatered diesel fuel to the diesel engine.

16 Claims, 5 Drawing Sheets

(51) Int. Cl.
    *B01D 35/00*           (2006.01)
    *B01D 29/07*           (2006.01)
    *B01D 17/04*           (2006.01)
    *B01D 35/30*           (2006.01)

(52) U.S. Cl.
    CPC ........... *B01D 35/005* (2013.01); *B01D 35/30* (2013.01); *B01D 36/001* (2013.01); *B01D 36/003* (2013.01); *B01D 36/008* (2013.01); *B01D 2201/50* (2013.01); *B01D 2201/60* (2013.01); *B01D 2201/605* (2013.01)

(58) Field of Classification Search
    CPC .... B01D 29/07; B01D 17/045; B01D 36/001; B01D 2201/60; B01D 2201/605; B01D 2201/50
    USPC .......... 210/335, DIG. 5, 315, 342, 338, 489, 210/493.1, 493.3, 493.5, 495
    See application file for complete search history.

(56) References Cited

U.S. PATENT DOCUMENTS

| | | | |
|---|---|---|---|
| 4,860,713 A * | 8/1989 | Hodgkins | F02M 37/221 |
| | | | 123/510 |
| 2006/0180541 A1 * | 8/2006 | Hueppchen | B01D 35/0273 |
| | | | 210/450 |

* cited by examiner

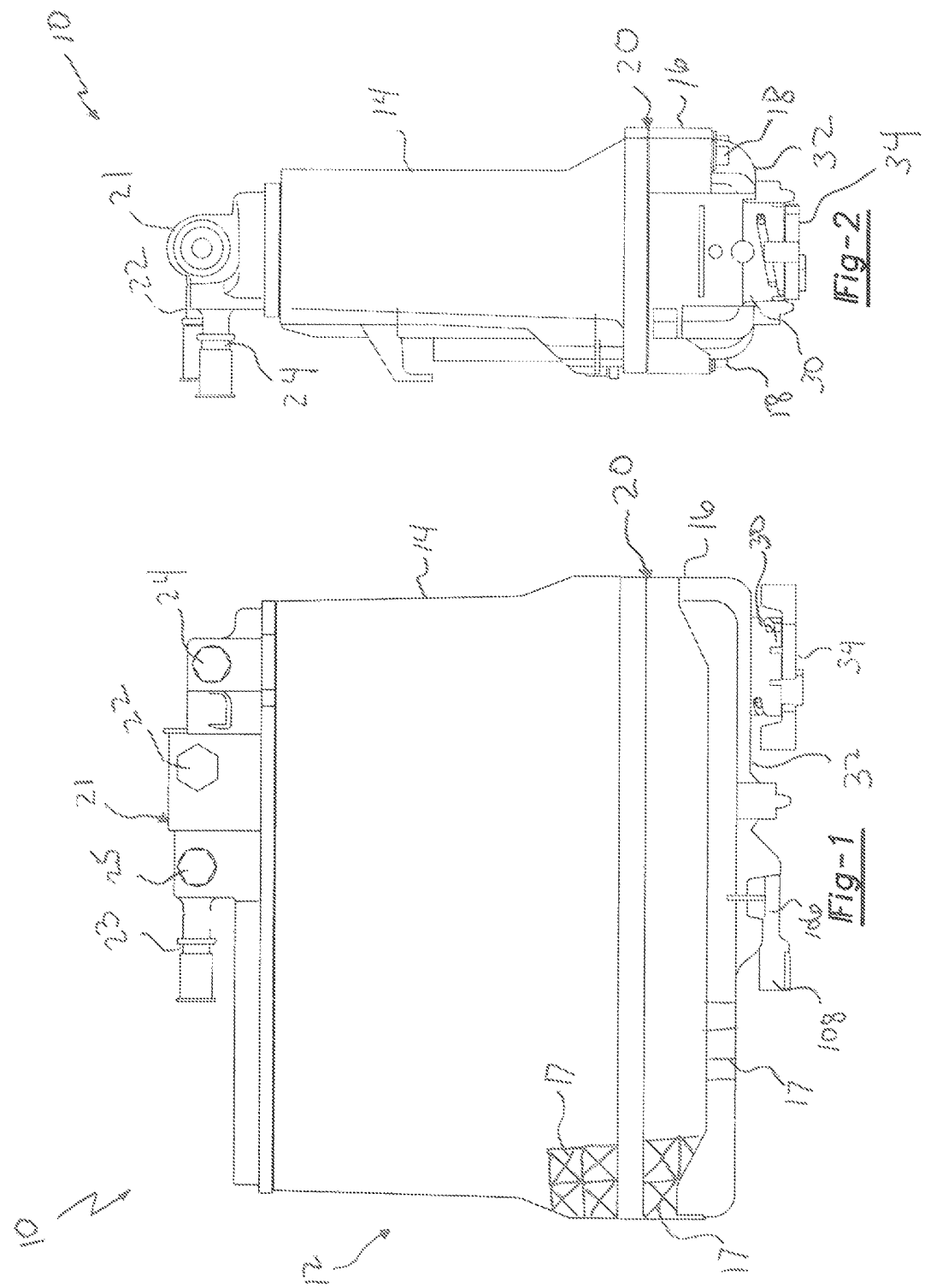

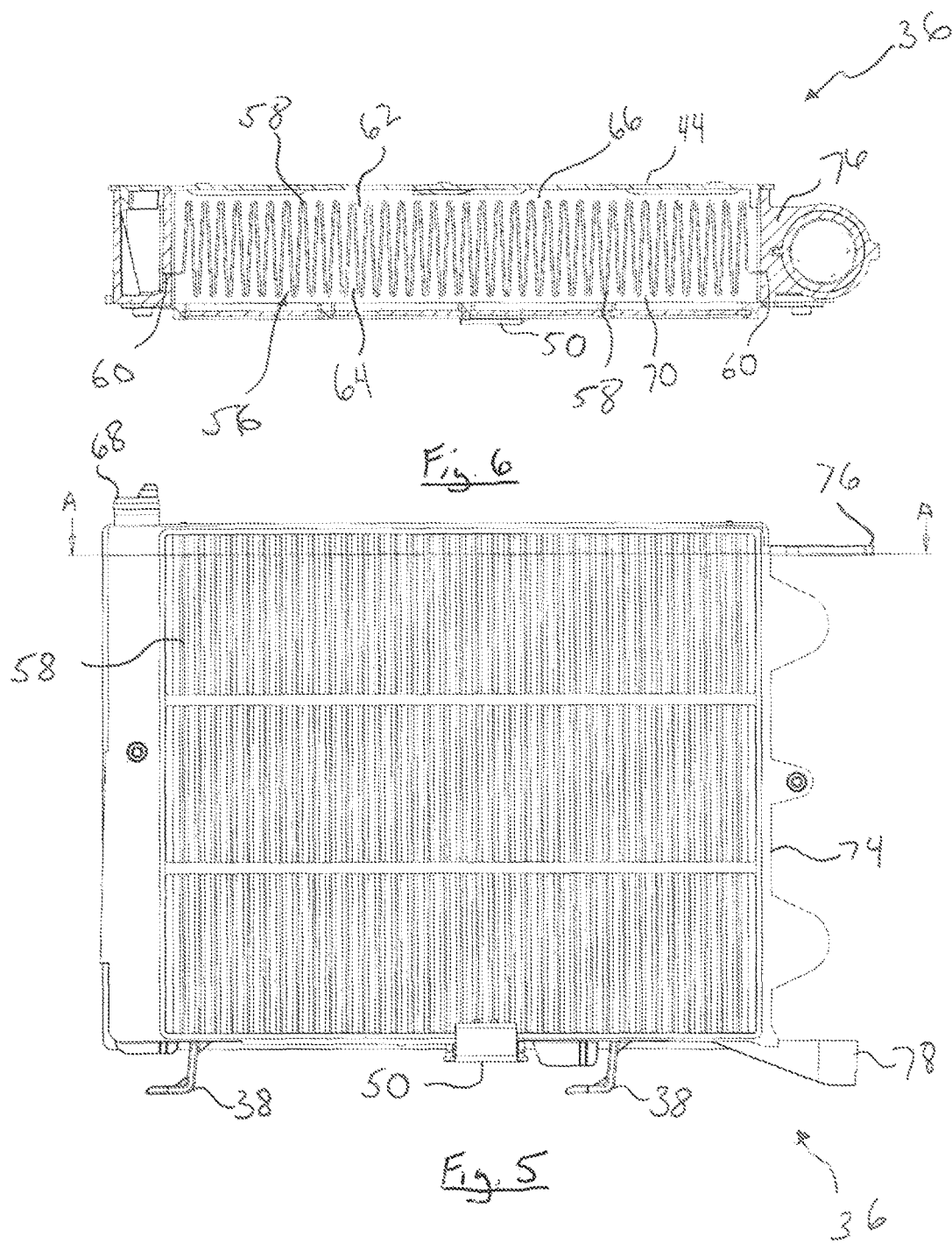

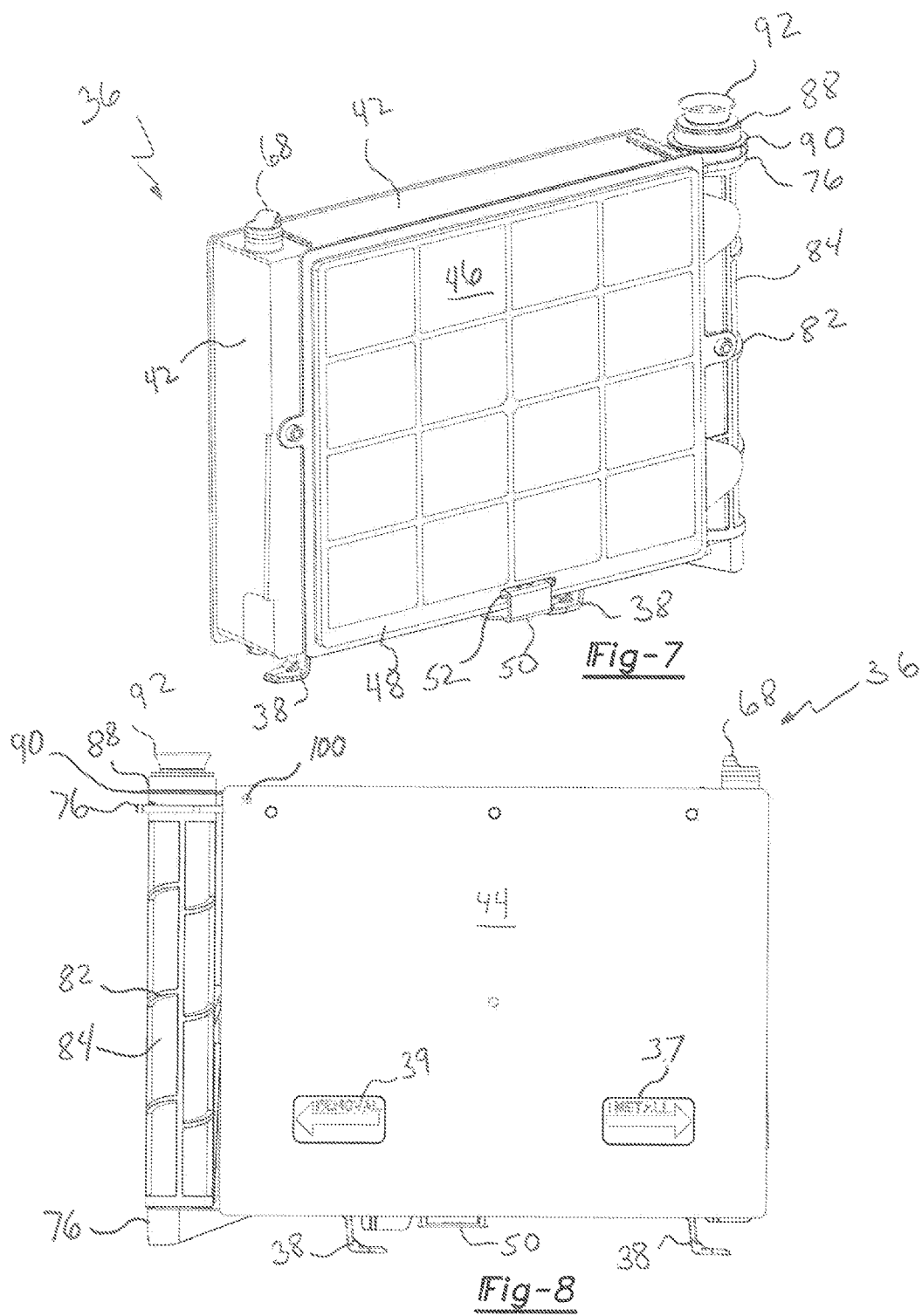

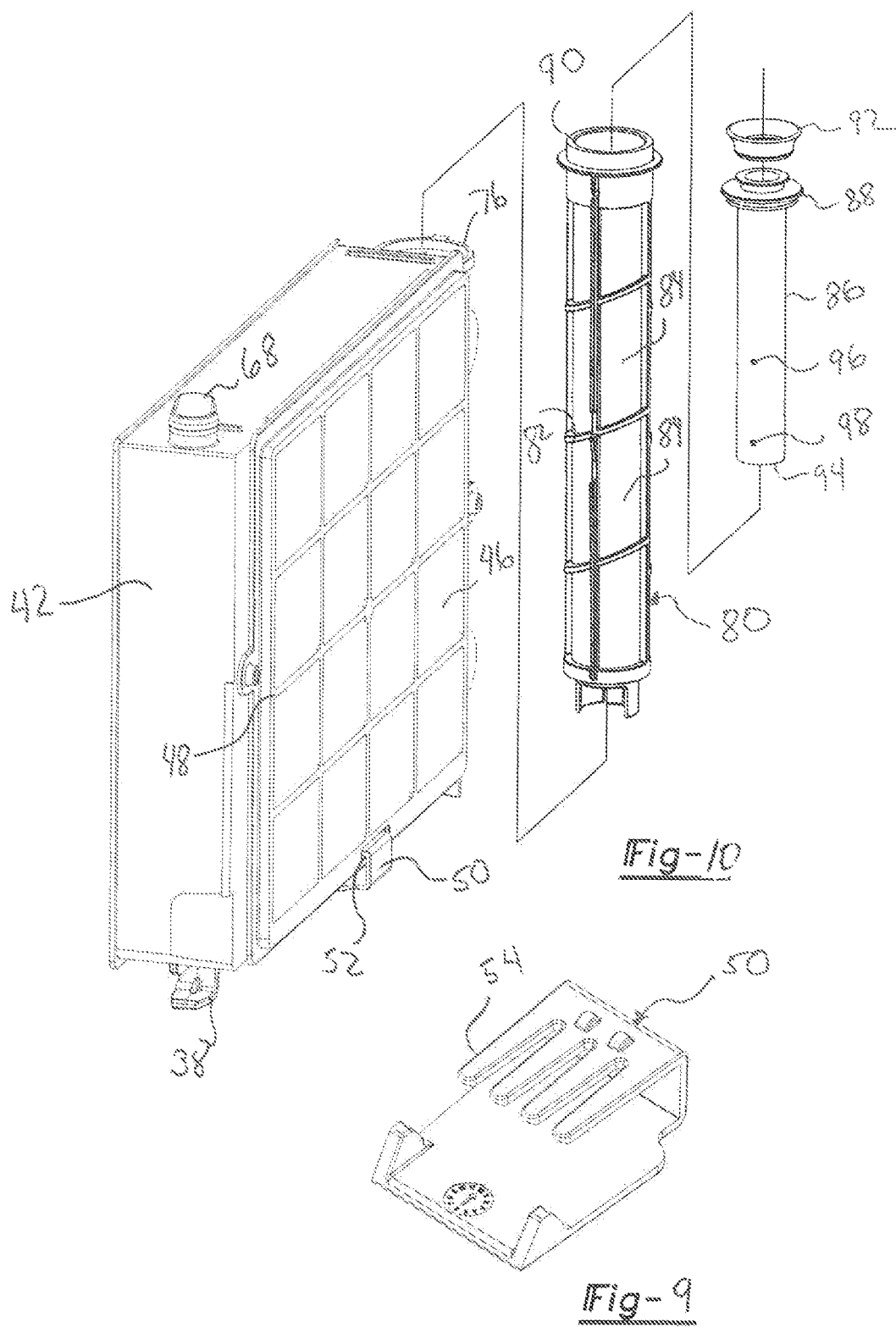

US 10,253,738 B2

DIESEL FUEL FILTER ASSEMBLY

PRIOR APPLICATIONS

This application claims priority to U.S. Provisional Patent Application No. 62/215,332 filed Sep. 8, 2015, the contents of which are incorporated herein by reference.

TECHNICAL FIELD

The invention of the present application relates generally toward a filtration assembly for a diesel fuel system. More specifically, the invention of the present application relates toward an optimized configuration of a filter assembly for a diesel fuel system.

BACKGROUND

Diesel fuel engines have become increasingly complex to meet both mileage requirements and environmental standards. As such, diesel fuel being delivered to these highly technical engines is required to be both particulate-free, and substantially absent of water and air, all of which can reduce diesel fuel engine performance and durability.

Presently, diesel fuel is filtered using a cylindrical filter making use of a concentric filtration arrangement. A particulate filter that separates particulates from the diesel fuel is disposed within a tubular housing. A water separator, when included, is typically aligned in the central portion of the tubular housing in a concentric orientation relative to the filtration media. The water separator reduces the amount of water disposed in the diesel fuel prior to delivering diesel fuel to the diesel engine. During operation, diesel fuel passes through the particulate filter media and subsequently through the water filtration system formed from one or more concentric layers before exiting the cylindrical filter. Although this design has proved functional for many years, the can-like shape of the filter housing has become increasingly problematic. For example, decreasing packaging space for filtration systems within an engine compartment is driving alternative designs for filtration assemblies. Limited space between the filter media and the water separator does not provide sufficient diffusion of the water prior to separation, an arrangement that has not proved adequate with can-like shape filtration assemblies. Therefore, it would be desirable to provide an optimized design of a filtration assembly capable of meeting the demands of new, highly technical diesel engines.

SUMMARY

The filtration assembly for filtering diesel fuel used by a diesel engine is disposed within the housing defining an unfiltered fuel inlet and a filtered fuel outlet. A filter element is disposed within the housing and receives fuel from the housing fuel inlet. The filter element defines a peripheral wall including a filter media sealably engaged within an inner surface of the peripheral wall. The filter media separates an unfiltered side from a filtered side of the filter element. The unfiltered side is enclosed with an impermeable barrier that is sealably affixed to the peripheral wall. The filtered side is covered with a permeable water diffuser allowing filtered fuel to pass through to an enclosure defined by the housing. A water separator assembly is disposed externally to the filter element and receives filtered fuel via the water diffuser. The water separator assembly includes water separator media for preventing water from passing into the separator. The separator assembly is interconnected to the filtered fuel outlet for providing filtered, dewatered diesel fuel to the diesel engine.

The assembly of the present invention solves a number of problems known to the prior art can-shaped diesel fuel filters. The filter element, and therefore the housing shape have a cuboid configuration providing a relatively flat filtration assembly. The flat filtration assembly is more easily packaged within architectural constraints of a modern diesel engine vehicle. Architectural constraints are defined by the engine, the engine compartment, the vehicle frame and the diesel fuel tank compartment. In addition, distancing the water separator from the filtration media and water diffuser provides a more functional and therefore enhanced water separation. Thus, diesel fuel having a low moisture content required of modern highly technical diesel engines can now be provided. Still further, with a reduced volume, additional filtration surface area is also achieved. The filtration media disposed within the filter element of the present invention extends in a linear manner providing the ability to include more filter media within the filter element than is possible of a can-shaped filter assembly where the filtration media must be compressed to a cylindrical configuration.

BRIEF DESCRIPTION OF THE DRAWINGS

Other advantages of the present invention will be readily appreciated, as the same becomes better understood by reference to the following detailed description when considered in connection with the accompanying drawings:

FIG. 1 shows a front view of the filter assembly of the present invention;

FIG. 2 shows a side view of the filter assembly of the present invention;

FIG. 5 shows a plan view of the filter media disposed inside the filter element;

FIG. 6 shows a sectional view of the filter media disposed inside the filter element though line A-A of FIG. 5;

FIG. 7 shows a perspective view of the filter element;

FIG. 8 shows a front view of the filter element;

FIG. 9 shows a perspective view of the conductive element; and

FIG. 10 shows an exploded view of the filter element and the water diffuser.

DETAILED DESCRIPTION

Figure 3:
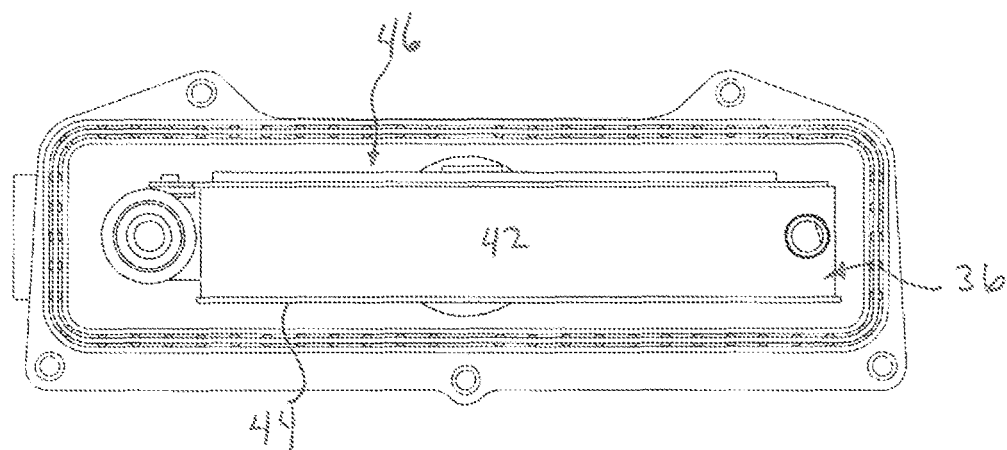
FIG. 3 shows a plan view of the filter element secured to the lower housing portion.

Referring to FIG. 1, a filtration assembly for filtering diesel fuel used by a diesel engine (not shown) is generally shown at 10. The assembly 10 includes a housing 12 defined by an upper housing portion 14 and a lower housing portion 16. The upper housing portion 14 is releaseably secured to the lower housing portion 16 by a plurality of fasteners 18 used to seal the upper housing portion 14 to the lower housing portion 16. In one embodiment, the fasteners 18 are contemplated to be threaded studs that are received by nuts (not shown) that are integrally molded with the upper housing portion 14. However, alternative fastening techniques, including spring clips, capable of providing sufficient sealing force between the upper housing portion 14 and the lower housing portion 16 are within the scope of this invention. In this manner, diesel fuel is prevented from leaking through a mating joint 20 defined between the upper housing portion 14 and the lower housing portion 16.

In the embodiment set forth above, the housing 12 includes an upper housing portion 14 and a lower housing portion 16. However, it should be understood to those of ordinary skill in the art that the housing 12 can take the form of a non-serviceable assembly 10 formed from a single housing element or two mating elements that are permanently affixed as will be explained further herein below.

A manifold 21 receives and evacuates diesel fuel from the housing 12. An unfiltered fuel inlet 22 is interconnected to the manifold 21 for delivering unfiltered fuel to the housing 12. A filtered fuel outlet 24 evacuates filtered fuel from the housing 12 and is interconnected with the diesel engine in a known manner.

Additionally, a manifold includes a recirculation inlet 23 and a recirculation outlet 25 that respectively receives and returns fuel to the fuel tank. The upper housing portion 14 and the lower housing portion 16 define a plurality of ribs that are configured to provide structural integrity to the housing 12. The ribs 17 present a web-like pattern that prevents the housing 12 from collapsing when a fuel pump (not shown) creates a negative pressure inside the housing 12 to extract diesel fuel from the diesel fuel tank. However, it should also be understood to those of ordinary skill in the art that the fuel pump could also be located to push fuel into the housing 12 creating a positive pressure inside the assembly 10.

A water outlet 30 is disposed in a bottom wall 32 of the lower housing portion 16. The water outlet 30 is configured as a slot at the base of an outlet member 31 extending upwardly from the bottom wall 32 into the lower housing portion 16. Alternatively, the outlet member extends downwardly or the outlet is defined by an aperture in the bottom wall 32. A valve cap 34 sealably engages a water outlet 30 for selective release of water filtered from the diesel fuel as will be explained further herein below. In addition, the valve cap 34 provides for draining fuel and water contained in the assembly 10 during service when disconnected or released from the water outlet 30.

Figure 4:
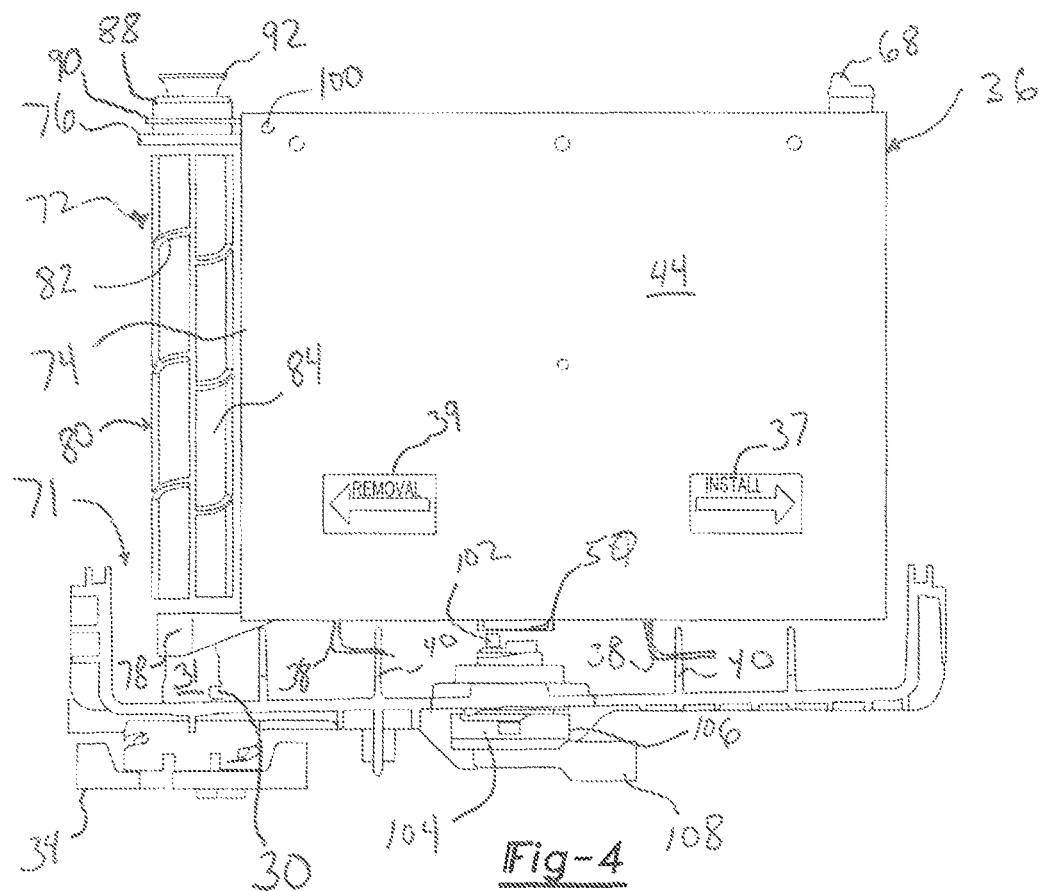
FIG. 4 shows a side view of the filter element secured to the lower housing portion.

Referring now to FIGS. 3 and 4, a filter element 36 is disposed within the housing 12 and is fully concealed on the upper housing portion 14 and the lower housing portion 16 is each sealably engaged. The filter element 36 is interconnected with cooperable links 38 to the lower housing portion 16 when engaged with connectors 40 that extend upwardly from the lower housing portion 16. Full engagement between the links 38 and the connectors 40 properly locates the filter element 36 within the housing 12. The filter element 36 defines a peripheral wall 42 having a cuboid or boxlike shape. An impermeable barrier 44 is sealably affixed to the peripheral wall 42 over first opening. The links extend from a lower member of the peripheral wall 42. Sliding the filter element 36 in the direction of an install arrow 37 disposed upon the impermeable barrier engages the links 38 with the connectors 40 for securing the filter element 36 to the lower housing portion 16. Sliding the filter element 16 in the direction of a removal arrow 39 disposed upon the impermeable barrier 44 disengages the filter element 36 from the lower housing portion 16 for removal and replacement. In the embodiment that includes a sealed filter assembly housing, the filter element 36 is not removed and replaced, but the entire filter assembly 10 is removed and replaced at an appropriate interval. As such, the filter element 36 may take a different form including being permanently affixed to the housing. In addition, various components of the filter element 36 may become separated from the filter element 36, such as, for example, a water diffuser explained below, for ease of assembly.

A permeable water diffuser or barrier 46 is supported by a grid-shaped support feature 48. The grid-shaped support feature 48 is sealably affixed to the peripheral wall 42 over a second opening on an opposite side of the peripheral wall 42 from the first opening so that fluid exits the filter element 36 through the permeable barrier 44. While the intent is that all of the fuel exits the filter element 36 through the water diffuser 46, it is possible that some of the fuel leaks through the abutment between the peripheral wall 42 and the support feature 48. Therefore, as used herein, sealably affixed means a substantially sealed abutment or a partially sealed abutment. The support feature 48 and the impermeable barrier 44 are sealably affixed over opposing sides of the peripheral wall 42 by way of sonic welding, laser welding, adhesive, or the like so that a fluidly sealable joint is formed between the peripheral wall 42, the permeable barrier 44 and the support feature 48. Therefore, diesel fuel entering the filter element 36 may only exit the fuel element 36 though the permeable barrier 46.

As understood to those of ordinary skill in the art, moisture is prone to be disposed in diesel fuel, the content of which is detrimental to a diesel fuel engine. Therefore, it is desirable to remove moisture from the diesel fuel prior to transferring the diesel fuel from the fuel tank (not shown) to a diesel engine. As such, the permeable barrier 46 takes the form of a water diffuser capable of diffusing droplets of water disposed in diesel fuel flowing through the filter assembly 10. The water diffuser 46 is contemplated to take form of a coalescent felt or mesh. Alternatively, the water diffuser 46 includes a second hydrophobic mesh to that described below. As set forth above, because the support feature 48 is sealably affixed to the peripheral wall 42, diesel fuel may exit the filter element 36 through the permeable barrier 46.

The support feature 48 receives a conductive member 50 through a slot 52 as is best represented in FIG. 7. The conductive member 50 defines a plurality of fingers 54 as best shown in FIG. 9. The fingers 54 are inserted through the slot 52 to contact filter media 56 disposed inside the filter element 36. The filter media 56 is best represented in FIGS. 5 and 6 and will be explained further herein below.

The filter media 56 is formed from an elongated filter paper including a plurality of fold 58 as best represented in FIG. 6. Therefore, the filter media 56 takes the form of a corrugated media sheet providing an increased surface area of filtration to the filter element 36 over an un-corrugated media sheet. The filter media 56 defines a peripheral edge 60, the full extent of which is sealed within the peripheral wall 42 of the filter element 36. To achieve this complementary configuration, the filter media 56 is inserted into an injection die cavity (not shown) and polymeric material defining the peripheral wall 42 is injected into the die cavity sealing the peripheral edge 60 of the filter media 56 within the resultant peripheral wall 42. The filter media 56 now separates an unfiltered side 62 from a filtered side 64 of the filter element 36. The unfiltered side 62 forms an unfiltered chamber 66 with the impermeable barrier 44. Therefore, fuel received through filter element inlet 68 into the unfiltered chamber 66 may only be evacuated through the filter media 56.

The filtered side 64 of the filter media 56 forms a filtered chamber 70 with the permeable barrier 46. Therefore, fuel passing through the filter media 56 from the unfiltered side 62 fills the filter chamber 70 and is evacuated from the filter chamber 70 through the permeable barrier 46. It should be understood by those of ordinary skill in the art that filtered fuel fills the housing 12 of the filtration assembly 10 after having passed through both the filter media 56 and the permeable barrier 46. As such, filtered diesel fuel fills a space 71 disposed between the filter element 36 and the housing 12.

Referring again to FIG. 4, the water separator assembly 72 is secured to a side member 74 of the peripheral wall 42 and is disposed in a substantially vertical orientation. The water separator assembly 72 is received by an upper mount 76 and a lower mount 78 each of which extend outwardly from the side member 74 of the peripheral wall 42. It has been determined that spacing the water separation assembly 72 from the filter media 56 and permeable barrier 46 defining a water diffuser enhances the ability to separate water from the diesel fuel.

Referring now to FIG. 10, the water separator assembly 72 includes a tubular frame 80 defining a support lattice 82. A water separator 84 takes the form of a screen extending between openings of a support lattice 82. The water separator 84 allows filtered fuel to pass into the tubular frame 80 while preventing water from entering the tubular frame 80. Because water has a higher specific gravity than a diesel fuel, water collecting upon the water separator 84 falls to the water outlet 30 defined in the bottom wall 32 of the lower housing portion 16 where it is drained upon releasing the valve cap 34. It should also be understood that the entire assembly 10 may also be drained of diesel fuel by releasing the valve cap 34.

A tube 86 extends downwardly into the tubular frame 80. The tube 86 includes a sealed portion 88 that seals to an upper flange 90 of the tubular frame 80. A sealing grommet 92 receives the sealed portion 88 of the tube 86. The grommet 92 seals to the filtered fuel outlet 24 in a manner that prevents diesel fuel containing water being evacuated from the filtration assembly 10 through the filtered fuel outlet 24. Therefore, to exit the filter assembly 10 through the filtered fuel outlet 24, fuel must first pass through the water separator 84 and enter a lower end 94 of the tube 86. The fuel then flows upwardly in the tube 86 and exits the filter assembly through the clean fuel outlet 24.

The filter assembly 10 is also configured to reduce, and even recirculate air trapped in the diesel fuel from entering the diesel engine through the filter assembly 10. As such, the tube 86 includes an upper air aperture 96 and a lower air aperture 98. The upper air aperture 96 includes a similar cross-sectional area as does the lower air aperture 98 to balance evacuation of air from the tube 86. Therefore, air entering the tube 86 is trapped between the upper air aperture 96 and the lower air aperture 98. In addition, the impermeable barrier 44 affixed to the peripheral wall 42 and the filter element 36 includes an air vent 100 located in an upper corner 102 to allow air to vent from the filter element 36. Therefore, while the impermeable barrier has been described herein above as being sealably affixed to the peripheral wall 42, it is possible that some diesel fuel will escape through the air vent 100.

Referring again to FIG. 4, the conductive element 50 abuts a ground element 102 of a sensor 104. The sensor 104 is received through an opening 106 defined by the lower housing portion 16. The sensor 104 includes an electrical connector 108 that includes the ground 102 and a connection to a vehicle controller (not shown). The sensor 104 senses the amount of moisture disposed within the diesel fuel contained inside the housing 12 along with providing a ground 102 to eliminate static electricity derived from the fuel passing through the filter media 56.

The invention has been described herein in an illustrative manner, and it is to be understood that the terminology which has been used is intended to be in the nature of words of description rather than of limitation. Obviously, many modifications and variations of the invention are possible in light of the above teachings. The invention can be practiced otherwise than as specifically described within the scope of the appendant claims.

What is claimed is:

1. A filtration assembly for filtering diesel fuel used by a diesel engine, comprising:
   a housing defining an unfiltered fuel inlet and a filtered fuel outlet;
   a filter element disposed within said housing and receiving fuel from said unfiltered fuel inlet, said filter element defining a peripheral wall including filter media sealably engaged therewith defining an unfiltered side and a filtered side of said filter element, said unfiltered side being enclosed with an impermeable barrier sealably affixed to said peripheral wall and said filtered side being enclosed with a permeable water diffuser allowing filtered fuel to pass therethrough;
   a water separator assembly disposed externally to said filter element and receiving filtered fuel via said permeable water diffuser, said water separator assembly including water separator media for preventing water from passing into said water separator, wherein said water separator further includes an air modulator for modulating an amount of air passing through said water separator to said filtered fuel outlet, said air modulator comprising a substantially vertical tube extending downwardly from a sealable engagement with said filtered fuel outlet with said substantially vertical tube defining an upper air aperture and a lower air aperture spaced beneath said upper air aperture; and
   said water separator assembly being interconnected to said filtered fuel outlet for providing filtered, dewatered diesel fuel to the diesel engine.

2. The filtration assembly set forth in claim 1, wherein said water separator assembly is interconnected to said peripheral wall of said filter element inside said housing.

3. The filtration assembly set forth in claim 1, wherein said filter media presents a continuous corrugated configuration thereby increasing surface area of filtration.

4. The filtration assembly set forth in claim 1, wherein said filter media defines an edge being integrally molded within said peripheral wall.

5. The filtration assembly set forth in claim 1, wherein said filter element is substantially box shaped and said water separator is substantially tubular.

6. The filtration assembly set forth in claim 1, wherein said filter element includes a conductive member interconnecting said filter media and a ground thereby dissipating static electricity generated by fuel passing through said filter element.

7. The filtration assembly set forth in claim 1, wherein said housing defines a first housing portion being sealably engaged to a second housing portion and said filter element is releaseably secured to one of said first housing portion or said second housing portion.

8. The filtration assembly set forth in claim 1, wherein said filter element is irretrievably secured within said housing.

9. A filtration assembly for filtering diesel fuel used by a diesel engine, comprising:
   a housing defining an unfiltered fuel inlet and a filtered fuel outlet;

a filter element disposed within said housing and receiving fuel from said unfiltered fuel inlet, said filter element defining a peripheral wall including filter media sealably engaged therewith defining an unfiltered side and a filtered side of said filter element, said unfiltered side being enclosed with an impermeable barrier sealably affixed to said peripheral wall and said filtered side being enclosed with a permeable water diffuser allowing filtered fuel to pass therethrough;

a water separator assembly disposed externally to said filter element and receiving filtered fuel via said permeable water diffuser, said water separator assembly including water separator media for preventing water from passing into said water separator; and said water separator assembly being interconnected to said filtered fuel outlet for providing filtered, dewatered diesel fuel to the diesel engine, wherein said water separator defines a solid wall proximate said filtered fuel outlet, said solid wall circumscribing a substantially vertical tube and defining a wall aperture having a similar aperture cross-section as an upper air aperture defined by said substantially vertical tube.

10. A filter element assembly for filtering diesel fuel, comprising:

a vessel defined by a peripheral wall having a cuboid configuration with a first face defining a first opening and an opposing second face defining a second opening, said first opening being sealed by an impermeable barrier and said second opening being covered by a permeable member;

a filter media disposed inside said vessel defining a continuous edge sealably affixed at said peripheral wall thereby bifurcating said vessel into a unfiltered chamber and a filtered chamber whereby fuel passes from said unfiltered chamber to said filtered chamber through said filter media; and a water separator disposed externally to said vessel for separating water from filtered diesel fuel received from said water separator, wherein said water separator includes an air modulator for modulating an amount of air passing through said water separator, said air modulator comprising a substantially vertical tube defining an upper air aperture and a lower air aperture spaced beneath said upper air aperture.

11. The assembly set forth in claim 10, wherein said permeable member comprises a water diffuser.

12. The assembly set forth in claim 10, wherein said filter media comprises a continuous corrugated sheet of filter media.

13. The assembly set forth in claim 10, wherein said continuous edge of said filter media is embedded in said peripheral wall thereby sealably affixing said filter media to said peripheral wall.

14. A filter element assembly for filtering diesel fuel, comprising:

a vessel defined by a peripheral wall having a cuboid configuration with a first face defining a first opening and an opposing second face defining a second opening, said first opening being sealed by an impermeable barrier and said second opening being covered by a permeable member, wherein said permeable member includes a grid shaped support feature having a peripheral element sealably affixed to said peripheral wall of said vessel;

a filter media disposed inside said vessel defining a continuous edge sealably affixed at said peripheral wall thereby bifurcating said vessel into a unfiltered chamber and a filtered chamber whereby fuel passes from said unfiltered chamber to said filtered chamber through said filter media; and a water separator disposed externally to said vessel for separating water from filtered diesel fuel received from said water separator.

15. A filter element assembly for filtering diesel fuel, comprising:

a vessel defined by a peripheral wall having a cuboid configuration with a first face defining a first opening and an opposing second face defining a second opening, said first opening being sealed by an impermeable barrier and said second opening being covered by a permeable member;

a corrugated filter media disposed inside said vessel defining a continuous edge sealably affixed at said peripheral wall thereby bifurcating said vessel into a unfiltered chamber and a filtered chamber whereby fuel passes from said unfiltered chamber to said filtered chamber through said corrugated filter media; and a water separator disposed externally to said vessel for separating water from filtered diesel fuel received from said water separator, further including a conductive member interconnecting said filter media and a grounded element thereby dissipating static electricity generated by fuel passing through said filter element, wherein said grounded element includes a plurality of fingers being received by folds disposed in said corrugated filter media.

16. A filter element assembly for filtering diesel fuel, comprising:

a vessel defined by a peripheral wall having a cuboid configuration with a first face defining a first opening and an opposing second face defining a second opening, said first opening being sealed by an impermeable barrier and said second opening being covered by a permeable member;

a filter media disposed inside said vessel defining a continuous edge sealably affixed at said peripheral wall thereby bifurcating said vessel into a unfiltered chamber and a filtered chamber whereby fuel passes from said unfiltered chamber to said filtered chamber through said filter media; and a water separator disposed externally to said vessel for separating water from filtered diesel fuel received from said water separator, wherein said impermeable barrier comprises an air vent being cooperable with an air modulator disposed in said water separator for venting air from said vessel.

* * * * *